(No Model.)
G. A. MACBETH.
SIGNAL LENS.
No. 351,609. Patented Oct. 26, 1886.
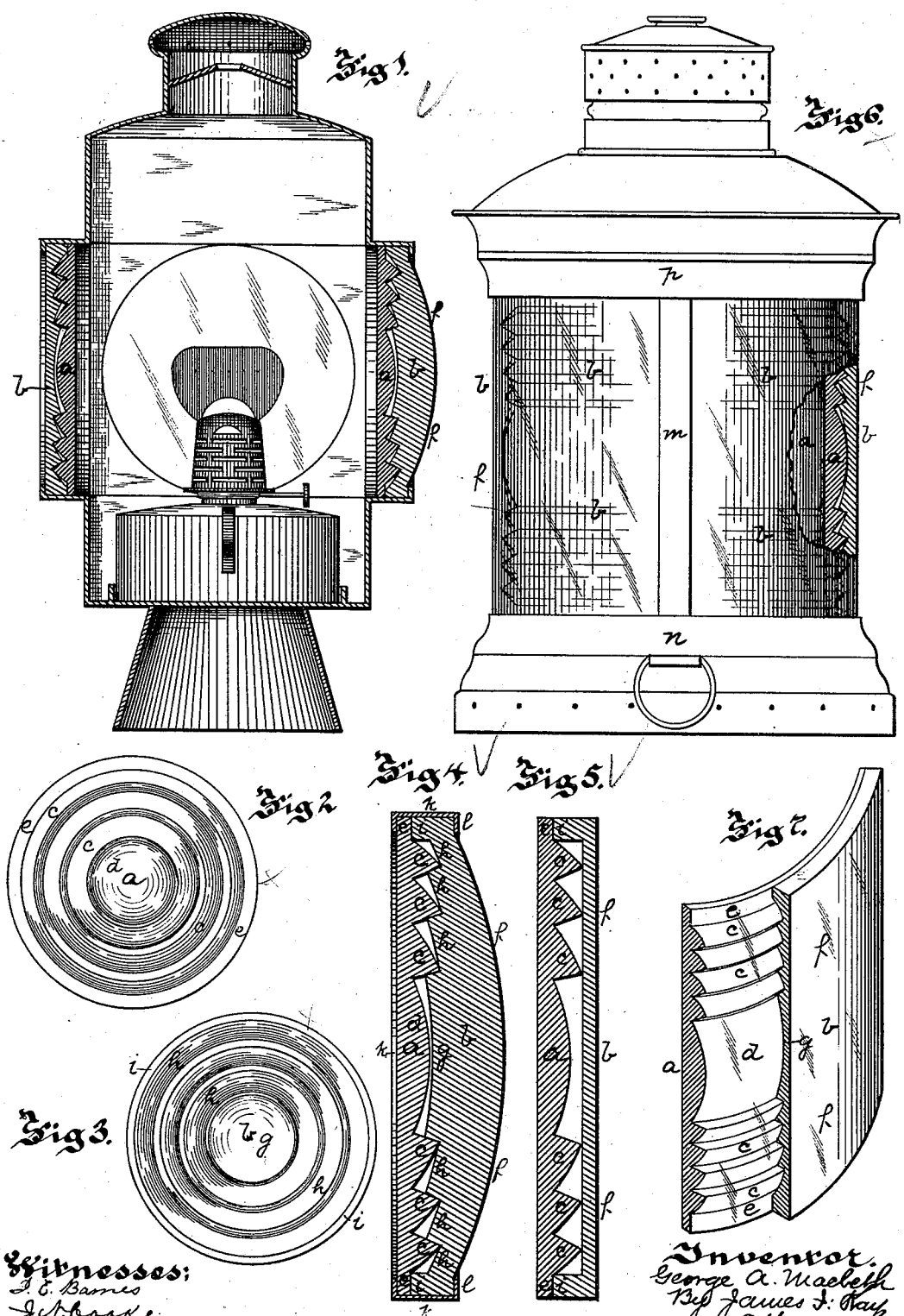

UNITED STATES PATENT OFFICE.

GEORGE A. MACBETH, OF PITTSBURG, PENNSYLVANIA.

SIGNAL-LENS.

SPECIFICATION forming part of Letters Patent No. 351,609, dated October 26, 1886.

Application filed April 19, 1886. Serial No. 199,439. (No model.)

*To all whom it may concern:*

Be it known that I, GEORGE A. MACBETH, of Pittsburg, in the county of Allegheny and State of Pennsylvania, have invented a new and useful Improvement in Signal-Lenses; and do hereby declare the following to be a full, clear, and exact description thereof.

My invention relates to the corrugated lenses employed in signal and other lanterns. These lenses are formed either as circular or semaphore lenses, or as the globes of the lanterns, in which the corrugations extend horizontally around the lantern globe, the first form of corrugated lens being used mostly in railroad signal-lanterns, either for switch-signals or for car-signals, and the lanterns having different-colored lenses therein in order to signal the position of the switch or of the train. The lenses are formed corrugated to reduce the thickness of the glass therein, several corrugations having curved faces formed on the lens and the faces of the corrugations transmitting and deflecting the light, in the same manner as if a bull's-eye lens were employed, the thickness and weight of the lens being reduced in this manner; and at the same time, where the lens is formed of colored glass, as the thickness of the lens is substantially the same throughout, the light will penetrate the lens with the same ease throughout its entire face, it being found that in bull's-eye lenses formed of glass of certain colors the central portion of the lens is so thick as to prevent the easy penetration of the light and the principal light from the lens is obtained through the outer portions thereof.

The special objects of my invention are to protect these corrugated lenses from fracture or injury by contact with or blows from other hard substances, and to prevent the settling of dust or dirt in the corrugations of the lenses, as well as to facilitate the cleaning of the lenses. To these ends I employ with the lens a face-protector having corrugations on its inner face corresponding in position to those of the lens, and having a smooth outer face, this face-protector affording protection to the lens from injury and presenting a smooth face on which the dust will not settle, and which can be easily cleaned if blurred in any manner. I have also improved these lenses in other particulars, as hereinafter set forth and claimed.

To enable others skilled in the art to make and use my invention, I will describe the same more fully, referring to the accompanying drawings, in which—

Figure 1 is a cross-section of a railway or switch signal-lantern illustrating my invention. Figs. 2 and 3 are face views of the lens and the face-protector, forming the combined lens. Figs. 4 and 5 are detached cross-sections of the combined lens. Fig. 6 is a side view, partly broken away, of a pole-lantern illustrating my invention; and Fig. 7 is a perspective view, partly broken away, of the lens and face-protector employed therewith.

Like letters of reference indicate like parts in each.

Where my invention is employed in connection with a corrugated semaphore-lens, as shown in Figs. 1, 2, 3, and 4, I generally employ for the lens proper flint or lead glass, and for the face-protector crown or lime glass, the refracting power of the flint-glass being greater than that of the crown-glass, so that the light transmitted through the lens is first deflected by the flint-glass lens in substantially the line desired, and in passing through the crown-glass face-protector it is deflected but little from the course in which it is thrown by the flint-glass lens. I prefer to employ flint-glass for the lens proper, for the reason, among others, that it is not so liable to crack or break under changes of temperature, and it is exposed directly to the heat of the lamp. The combined lens may, however, be formed with the lens proper of crown-glass and the face-protector of flint-glass, the curvature of the faces of the corrugations being, of course, changed according to the direction in which the light is to be thrown; or, in some cases, both lens and face-protector may be formed of the same kind of glass, the corrugations being formed of such curvature as to deflect the light in the desired direction, or the inner and outer faces of the protector being substantially parallel or of the same curvature, so as to have little or no effect upon the course of the light.

The lens proper, *a*, as well as the face-protector *b*, are pressed to shape, the faces of the corrugations *c* of the lens being convex, and the curvature thereof depending upon the desired deflection of the light through the lens, the central portion or bull's-eye, *d*, and the faces of the corrugations of the lens being sections of circles drawn from the same center, this being well known to lens manufacturers. At the outer edge of the lens I prefer to form a plain or flat portion or face, forming a bearing-face extending around the outer corrugation, as at e.

The face-protector b is provided with a smooth or plain outer face, f, and its inner face is generally provided with corrugations corresponding in position to those on the corrugated face of the lens, so that when the two parts of the combined lens are placed together they will fit together and act to support each other, the corrugated face-protector b having the concave central portion, g, and the corrugations h corresponding in position to the corrugations of the lens proper, and the edge or face i forming a bearing-face extending around the outer corrugations and fitting against the bearing face or portion e of the lens proper. The refracting or deflecting power of the flint-glass lens is greater than that of the crown-glass face-protector, and as the light passes through the lens it is deflected in the direction desired, or possibly a little more than desired, and as it passes through the face-protector it is deflected slightly in the opposite direction, the angle of deflection through the face-protector being but slight, or passes directly through the face-protector, where the inner and outer faces thereof are substantially parallel.

The curvature of the corrugated faces of the lens and its face-protector can be changed, so as to throw the light passing through the combined lens in whatever direction desired. For example, in the lens shown in the enlarged view, Fig. 4, the face-protector will act to spread the light slightly after it passes through the lens proper, the curvature of the faces of the corrugations h of the face-protector being but slightly greater than that of the smooth convex outer face, f, thereof; but where the outer face f and the faces of the corrugations h are drawn from the same circle the light will pass directly through the face-protector, being directed in the course desired entirely by the lens proper. (In such case the inner and outer face of the protector to be made smooth, as shown in Fig. 5.)

As the edges of the corrugations h of the face-protector fit against the edges of the corrugations c of the lens, it is evident that they act to support each other, and in case of blows upon the outer surface of the face protector there is but little fear of fracture of the same, while there is no fear whatever of chipping or defacing the smooth outer surface of the face-protector, and there is no liability of dust or dirt settling upon the outer surface of the face-protector and thus preventing the passage of the light through the same. As the bearing portions or faces e i of the two parts of the combined lens fit against each other, no opportunity is afforded for the entrance or settlement of dust or dirt between the two parts of the lens, and the two parts are further protected from such action by cement or like material placed between these flat faces and forming a tight or sealed joint.

The two parts of the lens may be secured together in any suitable manner, either by pasting cloth or other suitable material around the edges of the lens, or, as shown in the drawings, by securing the two parts of the lens within an annular sheet metal ring, as at k, this ring having a lip or lips, l, fitting onto the outer surface of the lens or face-protector, while the other edge of the ring is turned up onto the opposite face of the combined lens.

The outer faces of either the lens or the face-protector may be slightly curved, as desired, either for the purpose of correcting the deflection of the light as it passes through the combined lens, or for any other reason, a convex-faced protector being shown to the right in Fig. 1, and in Fig. 4, as before referred to.

When my invention is employed with pole-lanterns, or other lanterns having corrugations extending around the same, as shown in Figs. 5 and 6, the face-protector b, and, if desired, the lens or lantern globe, may be formed in sections and secured within the lantern in any suitable manner, the lantern shown having perpendicular standards m, extending from the base n to the top p, and the lens and face-protector being secured between these standards.

The construction of the combined lens is substantially the same in this form of lantern as in the signal-lanterns above described, except that the corrugations extend horizontally across the outer face of the lens or lantern globe and the inner face of its face-protector, instead of in a circle, as in the ordinary semaphore-lens. The flat portion or faces e i of the two parts of the combined lens fit against each other so as to support each other, as above described, and their edges may be secured in any suitable manner for fastening within the lantern. When my improvements are employed with colored signal-lanterns, I form the inner portion or lens proper of the glass of the required color, and the face-protector of colorless glass, so that in case of accident to the face-protector the colored signal-light still remains, and there is no liability of accident caused by a false signal.

When my improved signal-lenses are in use, the light from the lantern passes first through the corrugated lens and is deflected thereby, and then through the face-protector, being either deflected to a great extent by the flint-glass lens, and this deflection slightly corrected or turned in the opposite direction by the crown-glass face-protector, or being deflected slightly by the crown-glass lens and to a much greater extent by the flint-glass face-protector, according to the curvature of the lens and its outer protector, or the entire deflection being unparted by the lens, as above described.

In handling the lanterns, as the outer faces of the lenses are plain or smooth, there is little or no liability of the chipping or breaking of the same, as there is no rough place to catch against any object with which it might come in contact, while as the face-protector is supported by the lens throughout the greater portion of its inner face, a heavy blow is required to fracture the same; and even in case of fracture the passage of light through the combined lens is but little affected thereby.

As there is no rough face to receive any dirt or dust, it is evident that the lens will remain clean much longer than the ordinary corrugated lens, and that the difficulty of the light being impaired from this cause is entirely overcome, while at the same time the cleaning of the lens is greatly facilitated, there being no rough faces to wipe out, and as the edges of the lens and face-protector are sealed it is evident that no dirt can enter between the faces.

Where the flint glass lens and crown-glass face-protector are employed, the difficulty of the cracking of the lenses on account of the unequal heating thereof is to a great extent overcome, as the flint glass is not so liable to crack by overheating, and it is more directly exposed to the heat of the lamp.

I am aware that plane colored glass has been employed with colorless lenses, either back of or in front of the lens to impart the color of the plane glass to the light passing through the lens, the plane glass, when placed in front of the lens, being supported in a separate slide or holder therefrom. Though this plane glass might to some extent protect the corrugations of the lens from dust, yet no such protection from dust was obtained as where the lens and face-protector fit against each other, and the plane glass gave practically no protection from blows, as it was not sufficiently supported to sustain the rough handling these signal-lanterns receive, and if the plane glass was fractured, as it was colored and the lens colorless, it caused the lantern to give a false signal, and in some cases was the source of serious accidents.

What I claim as my invention, and desire to secure by Letters Patent, is—

1. The combination, with a corrugated lens, of a face-protector provided with an inner face having corrugations corresponding in position to those of the lens, and a smooth outer face, substantially as and for the purposes set forth.

2. The combination, with a corrugated lens, of a face-protector formed of glass having a different refracting power, and having corrugations corresponding in position to those of the lens, and a smooth outer face, substantially as and for the purposes set forth.

3. The combination, with the corrugated lens $a$, having the bearing face or faces $e$ beyond the corrugated portion thereof, of the face-protector $b$, having the corresponding bearing face or faces $i$ fitting against said bearing face or faces $e$, substantially as and for the purposes set forth.

4. The combination, with a corrugated lens having a bearing face or faces beyond the corrugated portion thereof, of a face-protector provided with an inner face having corrugations corresponding in position to those of the lens, and having a corresponding bearing face or faces fitting against the bearing face or faces of the lens, substantially as and for the purposes set forth.

5. The combination, with the corrugated lens $a$, having the bearing face or faces $e$ beyond the corrugated portion thereof, of the face-protector $b$, having the corresponding bearing face or faces $i$ fitting against the face or faces $e$, and suitable sealing material between said bearing-faces, substantially as and for the purposes set forth.

6. The combination, with a corrugated lens, of a face-protector fitting against the lens having a smooth outer face and a supporting ring or band fitting around the edges of the lens and face-protector, substantially as and for the purposes set forth.

7. The combination, with a corrugated lens, of a face-protector provided with an inner face having corrugations corresponding in position to those of the lens, and a curved smooth outer face, substantially as and for the purposes set forth.

8. The combination, with a corrugated lens formed of colored glass, of a face-protector formed of colorless glass and fitting against the lens, substantially as and for the purposes set forth.

In testimony whereof I, the said GEORGE A. MACBETH, have hereunto set my hand.

GEORGE A. MACBETH.

Witnesses:
JAMES I. KAY,
J. N. COOKE.